US009897450B2

(12) United States Patent
Aksu et al.

(10) Patent No.: US 9,897,450 B2
(45) Date of Patent: Feb. 20, 2018

(54) METHOD AND APPARATUS TO OBTAIN DIFFERENTIAL LOCATION INFORMATION

(71) Applicant: Nokia Technologies Oy, Espoo (FI)

(72) Inventors: Emre Baris Aksu, Espoo (FI); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 317 days.

(21) Appl. No.: 14/717,986

(22) Filed: May 20, 2015

(65) Prior Publication Data

US 2016/0342596 A1 Nov. 24, 2016

(51) Int. Cl.
*G01S 13/88* (2006.01)
*G01C 21/16* (2006.01)
*H04N 5/765* (2006.01)
*H04N 9/82* (2006.01)

(52) U.S. Cl.
CPC ........... *G01C 21/165* (2013.01); *H04N 5/765* (2013.01); *H04N 9/8205* (2013.01)

(58) Field of Classification Search
CPC ............... B60T 8/1706; B60T 2230/03; B60T 8/17554; B60T 2240/06
See application file for complete search history.

(56) References Cited

U.S. PATENT DOCUMENTS

| 3,509,765 A | 5/1970 | Stevenson, Jr. et al. |
| 2004/0218895 A1 | 11/2004 | Samadani et al. |
| 2005/0080543 A1* | 4/2005 | Lu ........................ B60G 17/018 701/70 |
| 2006/0271287 A1 | 11/2006 | Gold et al. |
| 2008/0152216 A1* | 6/2008 | Meadow ........... G06F 17/30241 382/154 |
| 2008/0262665 A1* | 10/2008 | Coulmeau ............ G08G 5/0039 701/16 |
| 2009/0084623 A1* | 4/2009 | Dagenais .............. B60T 8/1706 180/210 |

(Continued)

FOREIGN PATENT DOCUMENTS

EP 0959418 A2 11/1999

OTHER PUBLICATIONS

"3rd Generation Partnership Project; Technical Specification Group Services and System Aspects; Transparent end-to-end packet switched streaming service (PSS); 3GPP file format (3GP) (Release 12)", 3GPP TS 26.244, V12.3.0, Mar. 2014, pp. 1-63.

(Continued)

*Primary Examiner* — Redhwan K Mawari
(74) *Attorney, Agent, or Firm* — Harrington & Smith

(57) ABSTRACT

In accordance with an example embodiment of the invention there is at least a method and apparatus to perform operations including determining, by a media recording device, a differential location sample identifying a current location in time associated with the media recording device relative to a reference location; and at least one of storing and transmitting, by the media recording device, the differential location sample in an audio-visual media file. In accordance with another example embodiment of the invention there is at least a method and apparatus to perform operations including receiving and parsing, by a parser device, a plurality of differential location samples of an audio-visual media file to identify an absolute location of a media recording device.

14 Claims, 9 Drawing Sheets

Possible flow diagram for the storage of differential location samples with minimal error

(56) References Cited

U.S. PATENT DOCUMENTS

| | | | | |
|---|---|---|---|---|
| 2011/0172881 | A1* | 7/2011 | Seidel | B60T 8/1706 701/37 |
| 2012/0283929 | A1* | 11/2012 | Wakita | A61G 5/04 701/99 |
| 2012/0287274 | A1* | 11/2012 | Bevirt | H04N 7/185 348/144 |
| 2013/0250047 | A1* | 9/2013 | Hollinger | H04N 5/2252 348/36 |
| 2014/0172906 | A1 | 6/2014 | Sud et al. | |
| 2014/0200780 | A1* | 7/2014 | Watanabe | B60T 8/1706 701/68 |
| 2016/0342596 | A1* | 11/2016 | Aksu | H04N 5/765 |

OTHER PUBLICATIONS

"Information Technology—Coding of Audio-Visual Objects—Part 12: ISO Base Media File Format", ISO/IEC 14496-12, Third edition, Oct. 15, 2008, 120 pages.

"3rd Generation Partnership Project; Technical Specification Group Services and System Aspects; Transparent end-to-end Packet-switched Streaming Service (PSS); Protocols and codecs (Release 12)", 3GPP TS 26.234, V12.3.0, Mar. 2014, pp. 1-176.

"Support for Location Timed Metadata Tracks in the 3GPP File Format", 3GPP TSG-SA4 Meeting #81, S4-141345, Current version: 12.3.0, BlackBerry UK Limited, Nov. 3-7, 2014, 6 pages.

"Information Technology—Coding of Audio-Visual Objects—Part 14: MP4 File Format", ISO/IEC14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"Information Technology—Dynamic Adaptive Streaming Over HTTP (DASH)", Part 1: Media Presentation Description and Segment Formats, ISO/IEC 23009-1, Jan. 17, 2014, 13 pages.

Schulzrinne et al., "RTP: A Transport Protocol for Real-Time Applications", RFC 3550, Network Working Group, Jul. 2003, pp. 1-92.

"Information technology—Generic coding of moving pictures and associated audio information: Systems", SERIES H: Audiovisual and Multimedia Systems, Infrastructure of audiovisual services—Transmission multiplexing and synchronization, Recommendation ITU-T H.222.0, Jun. 2012, 228 pages.

"Information Technology—High Efficiency Coding and Media Delivery in Heterogeneous Environments", ISO/IEC 23008-12, 2014, 7 pages.

International Search Report and Written Opinion received for corresponding Patent Cooperation Treaty Application No. PCT/FI2016/050331, dated Aug. 18, 2016, 16 pages.

"DRAFT CR: Adding orientation information in the file format via an orientation sub-box and an orientation timed metadata track in 26.244", 3GPP TSG-SA4 Meeting #83, S4-150382, BlackBerry UK Limited, Apr. 13-17, 2015, 12 pages.

* cited by examiner

Figure 1: ISO File Format Box Structure Hierarchy

Figure 3: Sensor Data sampling in time

Figure 4: Storage of the Differential Location Samples in an ISOBMFF compliant file Figure 5: Possible flow diagram for the storage of differential location samples with minimal error Figure 6: Possible flow diagram for the reconstruction of absolute locations by the player/parser

METHOD AND APPARATUS TO OBTAIN DIFFERENTIAL LOCATION INFORMATION

TECHNICAL FIELD

The teachings in accordance with the exemplary embodiments of this invention relate generally to perform sensing and storage of differential location information and, more specifically, relate to performing sensing and storage of differential location information using algorithms to avoid and/or reduce error.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Currently geolocation data depends heavily on the Global Positioning System and similar position provision technologies. It is well-known that such global positioning systems may not be accessible indoors, in rough geographical locations, under poor weather conditions, and underwater. Hence, in such limiting environments an audio-visual recording that can also keep track of the location information would not be able to store geolocation information related to an audio-visual recording capture. The embodiments of the invention work to address at least these shortfalls of the current technologies.

SUMMARY

In an exemplary aspect of the invention, there is a method, comprising: determining, by a media recording device, a differential location sample identifying a current location in time associated with the media recording device relative to a reference location; and at least one of storing and transmitting, by the media recording device, the differential location sample in an audio-visual media file.

In an exemplary aspect of the invention, there is an apparatus comprising: at least one processor; and at least one memory including computer program code, where the at least one memory and the computer program code are configured, with the at least one processor, to cause the apparatus to at least: determine, with a media recording device, a differential location sample identifying a current location in time associated with the media recording device relative to a reference location; and at least one of store and transmit, with the media recording device, the differential location sample in an audio-visual media file.

In another exemplary aspect of the invention, there is an apparatus comprising: means for determining, with a media recording device, a differential location sample identifying a current location in time associated with the media recording device relative to a reference location; and means for at least one of storing and transmitting, with the media recording device, the differential location sample in an audio-visual media file.

In accordance with the example embodiment of the invention as described in the paragraph above, at least the means for determining and the means for storing and transmitting comprises a non-transitory computer readable medium including computer program code, and the computer program code executed by at least one processor.

In another exemplary aspect of the invention, there is a method comprising: receiving, by a parser device, a plurality of differential location samples of an audio-visual media file, wherein each differential location sample identifies a location associated in time with a media recording device relative to a reference location; and parsing the plurality of differential location samples to determine an absolute location of the media recording device, comprising: determining that a current differential location sample comprises coordinate data; identifying an initial location associated with the coordinate data; determining that a current differential location sample comprises an initial location of the media recording device; determining that the current differential location sample comprises initial velocity and acceleration data, wherein the initial velocity data is using a pre-selected axis convention; and based on at least the identified initial location, the initial velocity, and the acceleration data, determining the absolute location of the media recording device.

In yet another exemplary aspect of the invention, there is an apparatus comprising at least one processor; and at least one memory including computer program code, where the at least one memory and the computer program code are configured, with the at least one processor, to cause the apparatus to at least: receive, with a parser device, a plurality of differential location samples of an audio-visual media file, wherein each differential location sample identifies a location associated in time with a media recording device relative to a reference location; and parse, with the parser device, the plurality of differential location samples to determine an absolute location of the media recording device, comprising: determining that a current differential location sample comprises coordinate data; identifying an initial location associated with the coordinate data; determining that the current differential location sample comprises initial velocity and acceleration data, wherein the initial velocity data is using a pre-selected axis convention; and based on at least the determined initial location, initial velocity, and acceleration data, determining the absolute location of the media recording device.

In still another exemplary aspect of the invention, there is an apparatus comprising means for receiving, with a parser device, a plurality of differential location samples of an audio-visual media file, wherein each differential location sample identifies a location associated in time with a media recording device relative to a reference location; and means for parsing the plurality of differential location samples to determine an absolute location of the media recording device, comprising: means for determining that a current differential location sample comprises coordinate data, means for identifying an initial location associated with the coordinate data; means for determining that a current differential location sample comprises an initial location of the media recording device; means for determining that the current differential location sample comprises initial velocity and acceleration data, wherein the initial velocity data is using a pre-selected axis convention; and means for determining the absolute location of the media recording device based on at least the determined initial location, initial velocity, and acceleration data.

In accordance with the example embodiment of the invention as described in the paragraph above, at least the means for receiving, parsing and determining comprises a non-transitory computer readable medium including computer program code, and the computer program code executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
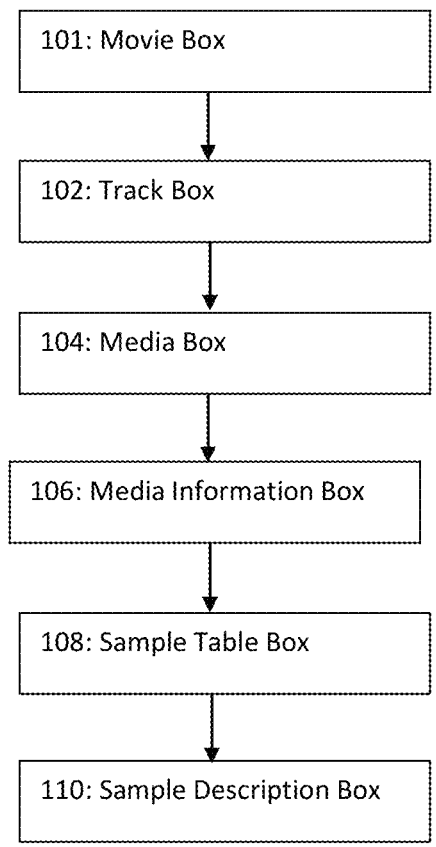
FIG. 1 shows an ISO base media file format (ISOBMFF) box structure hierarchy.

In this invention, we propose at least a method and apparatus to perform sensing and storage of differential location information, such as using algorithms to avoid and/or reduce error.

Current media capture devices such as cameras and mobile phones depend on GPS or like global positioning technologies (e.g., GLONASS) to generate "geo-location" information with altitude, latitude and elevation data. For still images, this information is stored as a metadata in the image file. EXIF metadata present in the JPEG files can be considered as an example.

Available media file format standards include ISO base media file format (ISO/IEC 14496-12, which may be abbreviated ISOBMFF) as well as standards derived from the ISOBMFF, such as MPEG-4 file format (ISO/IEC 14496-14, also known as the MP4 format), file format for NAL unit structured video (ISO/IEC 14496-15) and 3GPP file format (3GPP TS 26.244, also known as the 3GP format). ISO/IEC 14496-15 specifies the storage of bit streams of the Advanced Video Coding (H.264/AVC) standard and/or the High Efficiency Video Coding (HEVC a.k.a. H.265) standard and/or their extensions in ISOBMFF compliant files. The mentioned file formats (including the ISO file format itself) as well as other file formats derived from the ISOBMFF may be called the ISO family of file formats. ISO can be seen as short for International Organization for Standardization.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

One building block in the ISO base media file format is called a box. Each box may have a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes. Each box of the ISO base media file may be identified by a four-character code (4CC, four CC). A four-character code may interchangeably be represented by a 32-bit unsigned integer (by assuming a certain conversion of characters to 8-bit values, a certain bit endianness, and a certain byte endianness). The header may provide information about the type and size of the box.

According to the ISO family of file formats, a file may include media data and metadata that may be enclosed in separate boxes. In an example embodiment, the media data may be provided in a media data (mdat) box and the movie (moov) box may be used to enclose the metadata. In some cases, for a file to be operable, both of the mdat and moov boxes must be present. The movie (moov) box may include one or more tracks, and each track may reside in one corresponding track (trak) box. Each track is associated with a handler, identified by a four-character code, specifying the track type. Video, audio, and image sequence tracks can be collectively called media tracks, and they contain an elementary media stream. Other track types comprise hint tracks and timed metadata tracks. Tracks comprise samples, such as audio or video frames. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. The cookbook instructions may include guidance for packet header construction and may include packet payload construction. In the packet payload construction, data residing in other tracks or items may be referenced. As such, for example, data residing in other tracks or items may be indicated by a reference as to which piece of data in a particular track or item is instructed to be copied into a packet during the packet construction process. A timed metadata track may refer to samples describing referred media and/or hint samples. For the presentation of one media type, one media track may be selected. Samples of a track may be implicitly associated with sample numbers that may be incremented e.g. by 1 in the indicated decoding order of samples. The first sample in a track may be associated with sample number 1.

The 'trak' box contains a Sample Table box. The Sample Table box comprises e.g. all the time and data indexing of the media samples in a track. The Sample Table box is required to contain a Sample Description box. The Sample Description box includes an entry count field, specifying the number of sample entries included in the box. The Sample Description box is required to contain at least one sample entry. The sample entry format depends on the handler type for the track. Sample entries give detailed information about the coding type used and any initialization information needed for that coding.

In FIG. 1 there is illustrated an ISO file format box structure hierarchy including a Movie Box 101, Track Box 102, Media Box 104, Media Information Box 106, Sample Table Box 108, and Sample description box 110. The arrows in FIG. 1 indicate containment; for example, the Track Box is contained by the Movie Box. It is noteworthy that FIG. 1 includes some but not necessarily all boxes of an ISOBMFF file.

In ISOBMFF, samples that occupy a contiguous byte range form a chunk. The location of chunks within the file is described with the Chunk Offset box ('stco'). Each chunk is associated with one of the sample entries which are provided within the Sample Description box ('stsd'). A sample entry includes decoder initialization information, such as HEVC parameter sets, for the linked samples. The Sample Size box ('stsz') contains the length of the samples, hence enabling to locate individual samples within each chunk.

The ISO base media file format does not limit a presentation to be contained in one file. As such, a presentation may be comprised within several files. As an example, one file may include the metadata for the whole presentation and may thereby include all the media data to make the presentation self-contained. Other files, if used, may not be required to be formatted to ISO base media file format, and may be used to include media data, and may also include unused media data, or other information. The ISO base media file format concerns the structure of the presentation file only. The format of the media-data files may be constrained by the ISO base media file format or its derivative formats only in that the media-data in the media files is formatted as specified in the ISO base media file format or its derivative formats.

The ability to refer to external files may be realized through data references. In some examples, a sample description box included in each track may provide a list of sample entries, each providing detailed information about the coding type used, and any initialization information needed for that coding. All samples of a chunk and all samples of a track fragment may use the same sample entry. A chunk may be defined as a contiguous set of samples for one track. The Data Reference (dref) box, which may also be included in each track, may define an indexed list of uniform resource locators (URLs), uniform resource names (URNs), and/or self-references to the file containing the metadata. A sample entry may point to one index of the Data Reference box, thereby indicating the file containing the samples of the respective chunk or track fragment.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the file format for NAL unit structured video (ISO/IEC 14496-15), may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroup box (sbgp box) represents the assignment of samples to sample groups; and (2) a SampleGroupDescription box (sgpd box) contains a sample group entry for each sample group describing the properties of the group. There may be multiple instances of the SampleToGroup and SampleGroupDescription boxes based on different grouping criteria. These may be distinguished by a type field used to indicate the type of grouping. The sbgp' and the sgpd' boxes may be linked using the value of grouping_type and, in some versions of the boxes, also the value of grouping_type_parameter. The sbgp' box indicates the index of the sample group description entry that a particular sample belongs to.

The track referencing mechanism of ISOBMFF enables to indicate a directional link, reference, or dependency from one track to another. The track references are typed, and hence the exact semantics of the type of the relation between the indicated tracks depends on the track reference type. The track references are included in the Track Reference box Oren, which is contained in the Track box. The Track Reference box provides the references from the containing track to another track. The Track Reference box contains boxes, whose box type indicates the track reference type and whose payload contains the track identifier values of the referenced tracks. A box type of 'cdsc' (standing for content description) links a descriptive or metadata track to the content which it describes.

In ISOBMFF, each sample is associated with a decoding time, which may for example indicate when its processing is started. The decoding time may be given for example using the Decoding Time to Sample box ('stts') or the Track Fragment Header box ('tfhd'). Each sample is also associated with a composition time indicating when it is suggested to be rendered or output. Composition times are specific to their track, i.e. they appear on the media timeline of the track. A content author may determine and indicate the mapping of the media timeline of the track to the movie timeline, e.g. for synchronization of the tracks relative to each other, through edits in Edit List boxes ('elst') in each track. If no edits are present the media timeline is directly mapped to the movie timeline.

Samples of a timed metadata track may be time-mapped to the media samples based on the decoding times. A time-parallel sample (in a referenced track, relative to a particular sample within a particular track) may be defined as a sample in the reference track that has the same or, when a sample with the same decoding time is not available, the closest preceding decoding time relative to that of the particular sample in the particular track. For example, when a media track is referenced by a timed metadata track (through track references), a time-parallel sample in a media track for a metadata sample may be defined as the sample in the media track that has the same or, when no sample with the same decoding time is available, the closest preceding decoding time relative to the decoding time of the metadata sample. Hence, any metadata that should be associated to any media data (such as a video frame or audio frame) can be stored as a timed metadata track as defined in the relevant standards.

The track grouping mechanism of ISOBMFF can be used to indicate that tracks are grouped according to an indicated grouping criterion. The Track Group box included in the Track box enables indication of groups of tracks, where each group shares a particular characteristic or the tracks within a group have a particular relationship. The box contains zero or more boxes, and the particular characteristic or the relationship is indicated by the box type of the contained boxes. The contained boxes include an identifier (32-bit unsigned integer), which can be used to conclude the tracks belonging to the same track group. The tracks that contain the same type of a contained box within the Track Group Box and have the same identifier value within these contained boxes belong to the same track group.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using XML syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource; the resource can be formed by concatenating the extents.

In order to support more than one meta box at any level of the hierarchy (file, movie, or track), a meta box container box ('meco') may be used as one ISO base media file format. The meta box container box may carry any number of additional meta boxes at any level of the hierarchy (file, movie, or track). This may allow that e.g. the same metadata is being presented in two different, alternative metadata systems. The meta box relation box ('mere') may enable describing how different meta boxes relate to each other, e.g. whether they contain exactly the same metadata (but described with different schemes) or if one represents a superset of another one.

MPEG-H Image File Format (ISO/IEC 23008-12) is a derived specification of the ISO Base Media File Format (ISOBMFF). At the time of writing this patent application, ISO/IEC 23008-12 was a draft standard and hence it needs to be understood that the name and/or nickname of the standard may therefore change in the final version of the standard. Names such as High Efficiency Image File Format (HEIF) have been considered. Within the standard specification itself (or otherwise when the context is clear), the name "the Image File Format" can be used to refer to ISO/IEC 23008-12.

An image sequence may be defined as a sequence of images which may be associated with advisory timing and in which images may be inter predicted. In the MPEG-H Image File Format, image sequences are stored according to the track mechanism of the ISOBMFF. An image sequence track may be used when there is coding dependency between images or when the playback of the images is timed. The timing in the image sequence track may be defined to be advisory for the players. In order to distinguish between image sequences and motion video, a new handler type 'pia' has been introduced in the MPEG-H Image File Format.

Lately, 3GPP has taken steps to standardize the storage of geolocation information as a timed metadata track of 3GP files. Such operations are considered in 3GPP 26.244 Release 12.3.0 standard for example.

As similarly stated above, currently geolocation data depends heavily on the Global Positioning System (GPS) and similar position provision technologies (e.g. GLONASS). It is well-known that such global positioning systems may not be accessible indoors, in rough geographical locations, under poor weather conditions, and underwater as examples. Hence, in such limiting environments an audio-visual recording that can also keep track of the location information would not be able to store absolute geolocation information related to an audio-visual recording capture. The embodiments of the invention work to address at least these shortfalls.

Moreover, in some types of recordings or content, such as for Virtual Reality and presence type of experience, geolocation, such as {latitude, longitude, altitude} triplets, cannot be used or is not reasonable or necessary to be used, but they may use a pre-defined coordinate system instead.

Many media-capable devices are currently equipped with different types of motion/pressure sensors (e.g. gyroscope, accelerometer, barometer, etc.) which can be used to interpret the location-difference of a device relative to a previous reference location in time. Solutions such as Inertial Navigation Systems (INS) are built using this approach and used for location tracking (e.g. indoors). Such devices are getting more accurate every day.

There is currently no way to store such a differential location information in an ISOBMFF derived file format. In case of loss of GPS signal, the recording will lack any location information. Although it may have the necessary sensors to calculate the differential location, it has no mechanism and a standard way to store the location data in the audio-visual media file.

The invention improves the current geolocation storage capability by introducing the storage of differential location information in the media file.

Since differential location systems introduce also an error due to the accuracy of the sensors, error accumulation has to be kept under control in the implementation. The sensor sensitivity properties are also stored in the file for further processing and error-minimization of the location data.

Inertial Navigation System is explained in U.S. Pat. No. 3,509,765. Storage of location information and camera orientation information in an image (as part of the image data and for every image) is identified in patent US20140172906 A1. This patent claims that for every image, a location and camera orientation is stored in the image file. However, this patent does not contain any claims related to video type of media and does not provide a solution for storage of location information as a separate metadata in a hierarchical file format such as 3GP, MP4 or any ISOBMFF compliant file.

Further, it is noted that storage of location metadata in 3GPP File Format was introduced as a Change Request submitted to the 3GPP SA4 standardization in S4-141345 in October 2014. The method introduced in S4-141345 can store only global position information in latitude, longitude and altitude format. It does not cover the storage of any differential location information. It also does not cover the storage of any location information based on a virtual coordinate system (such as a coordinate system in a Virtual Reality environment or a coordinate system that identifies the geometry of an indoor environment).

The invention enables the storage of differential location information in a multimedia container file, such as an ISOBMFF compatible media file, by utilizing relevant data of on-device sensor and/or sensors physically connected with the audio-visual capturing device or device arrangement, such as a camera rig. These sensors can be (but not limited to) accelerometer, altitude meter or any other sensor that is used to formulate the velocity and acceleration of the device for a particular time interval. It enables the derivation of location information in conditions where global positioning systems are not accessible.

A new type of timed metadata sample entry and sample format are introduced. An algorithm is also provided to avoid or reduce the drift error.

Figure 2:
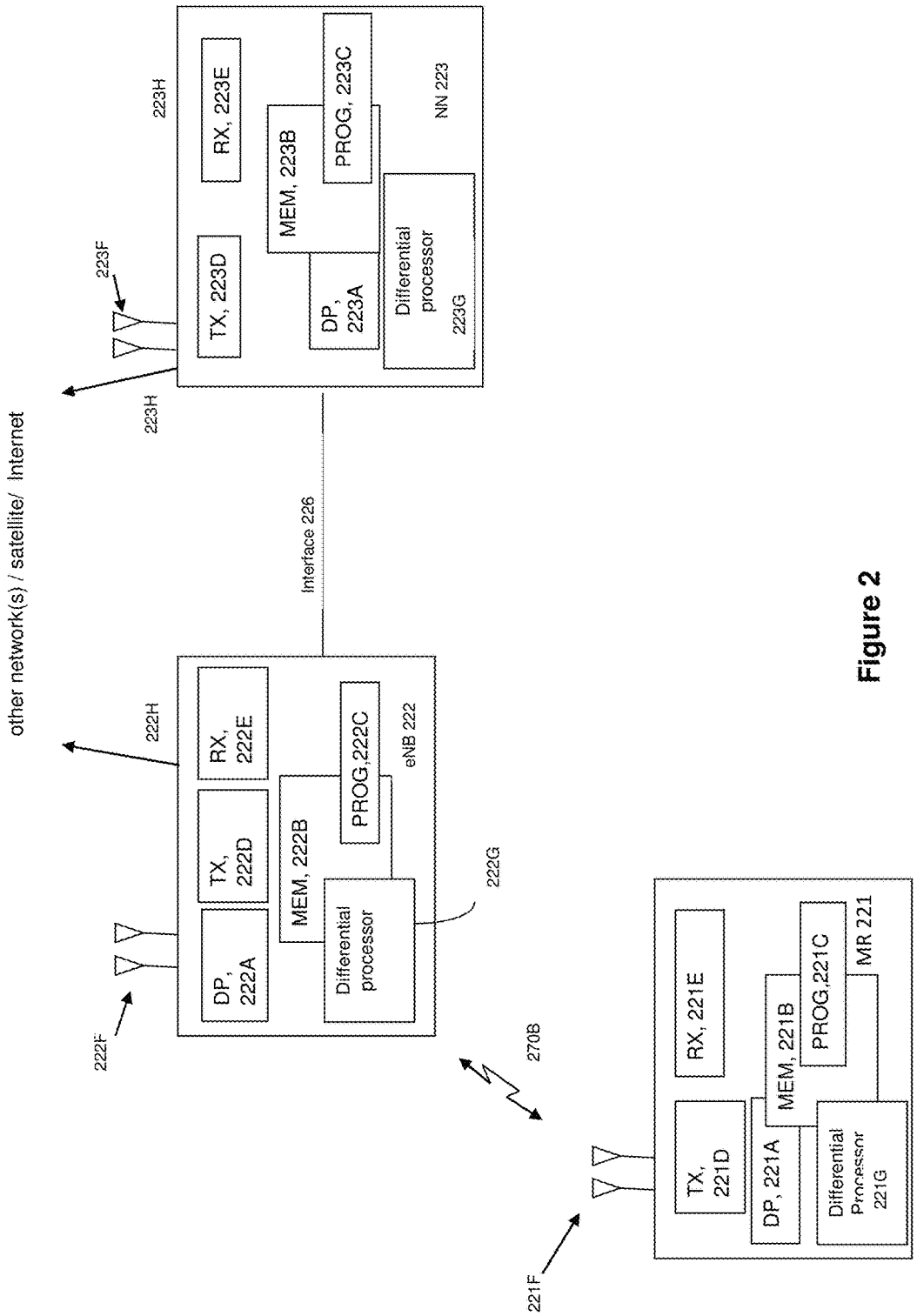
FIG. 2 shows a simplified block diagram of various electronic devices that are suitable for use in practicing the example embodiments of this invention.

Before describing the example embodiments of the invention in further detail reference is now made to FIG. 2 for illustrating a simplified block diagram of various electronic devices and apparatus that are suitable for use in practicing the example embodiments of this invention. In FIG. 2 there is a first network access node/eNB 222 coupled via an interface 226 to a network node/NN 223, of which the former is shown as adapted for communication over a wireless link with apparatus MR 221, such as a data collection device configured to connect to different network devices or nodes of a network or termed more generally a media recording device. It is noted that the operations in accordance with the example embodiments are not limited to a device such as the MR 221, but may be performed by any similarly configured device in accordance with the embodiments. Either the network nodes eNB 222 or NN 223 can comprise a Differential Processor device 222G and 223G, respectively, including at least a geolocation database for use in performing storage of differential location operations, as in accordance with the example embodiments of the invention. As stated above, the eNB 222 and the NN 223 may be communicatively coupled via an interface 226 to a primary network. Interface 226 can be for wireless communication via antennas 222F and 223F of the eNB 222 and the NN 223, respectively. Further, in a non-limiting embodiment the eNB 222 and the NN 223 may be coupled using interfaces 222H and 223H, respectively, which are coupled to further networks (e.g., PSTN and/or a data communications network/Internet, and/or a satellite system). The NN 223 can be another network device or a higher network node. In addition, the NN 223 can be located in a service provider or manufacturer network. Further, the NN 223 may be incorporated into any network device such as a network base station. In addition, the NN 223 can operate as a global positioning system and can comprise a server.

The MR 221 includes processing means such as at least one data processor 221A, storing means such as at least one computer-readable memory 221B storing at least one computer program 221C, communicating means such as a transmitter TX 221D and a receiver RX 221E for bidirectional wireless communications with the eNB 222 via one or more antennas 221F. In a non-limiting embodiment, connected to at least the memory 221B and the DP 221A of the MR 221 is a Differential Processor 221G. The MR 221 may operate the Differential Processor 221G to at least perform sensing and storage of differential location information for the MR 221, as in accordance with the example embodiments of the invention. In accordance with the example embodiments of the invention the antennas 221F may be configured with the DP 221A to transmit information regarding the detected traffic, and configured to receive the notifications regarding directions and/or operations to prevent/reduce traffic congestion.

The eNB 222 includes processing means such as at least one data processor 222A, storing means such as at least one computer-readable memory 222B storing at least one computer program 222C, and communicating means such as a transmitter TX 222D and a receiver RX 222E for bidirectional wireless communications, such as with its associated MR 221, via one or more antennas 222F. The eNB 222 also can be configured to at least perform communications with the NN 223 regarding the sensing and storage of differential location information at the MR 221, as in accordance with the example embodiments of the invention, as in accordance with the example embodiments of the invention.

Further, the NN 223 includes processing means such as at least one data processor 223A, storing means such as at least one computer-readable memory 223B storing at least one computer program 223C, and communicating means such as a transmitter TX 223D and a receiver RX 223E for bidirectional wireless communications, such as with its associated eNB 222, via one or more antennas 223F. The NN 223 also can be configured to at least perform communications with the NN 223 regarding the sensing and storage of differential location information at the MR 221, as in accordance with the example embodiments of the invention, as in accordance with the example embodiments of the invention.

Electronic devices implementing various aspects of the invention need not be the entire MR 221, eNB 222, and/or NN 223, but example embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the MR 221 can include, but are not limited to: cameras, elevation detectors, acceleration and velocity detectors, duration timers, and may be incorporated in stand alone device configured to connect to a network such as the network of FIG. 2. In accordance with an example embodiment the media recording functionality as described herein may also be incorporated in user equipment (UE) such as cellular telephones; data cards, USB dongles, personal portable digital devices having wireless communication capabilities including but not limited to laptop/palmtop/tablet computers, digital cameras and music devices, e-readers and Internet appliances. Other embodiments of the described MR 221 may be implemented as a M2M device which may not have a user interface directly but instead be remotely disposed for user-free operation.

Various embodiments of the computer readable MEM 221B, 222B and 223B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 221A, 222A and 223A include but are not limited to general purpose computers, special purpose computers, microprocessors, digital signal processors (DSPs) and multi-core processors.

Storage of the differential location information in the media file provides a location data in indoor, underwater or virtual environment media capture scenarios where global positioning system signals cannot be accessed or are not applicable. Storage of the differential location information in the media file is, however, not limited to scenarios where global positioning system signals cannot be accessed or are not applicable, but may be applied in all scenarios and differential location information may be stored together with global positioning information.

In an embodiment, a sequence of differential locations is obtained e.g. from one or more sensors, where each differential location in the sequence may be associated with a time, which may be for example the time the one or more sensors acquired the differential location. The differential location may be expressed for example in terms of acceleration towards an indicated direction. The sequence of differential locations is stored in a media file in a manner that its synchronization with timed media, such as audio and video, stored in the media file is enabled.

In an embodiment, differential location information may depend on the initial velocity and motion sensor data (e.g. accelerometer sensor) provided by the recording device. The acquisition and calculation of the sensor data and initial velocity are out of scope of this invention.

In an embodiment, differential location information is expressed relative to a reference time or sample using a particular coordinate system. The coordinate system may be indicated in the media file e.g. as an index or identifier among known coordinate systems, may be pre-defined e.g. in a standard defining the format of the media file, or may be undefined. For example, a metric coordinate system with y-axis towards magnetic north, x-axis orthogonal to y-axis (e.g. towards east), and z-axis orthogonal to the plane formed by the x and y axes. The reference time or sample may be for example the previous differential location sample, the previous such time or sample for which global positioning data is available. The differential location may be computed from the initial velocity and the measured acceleration, the computed differential location may be stored in the media file. For example, the differential location may be stored as x, y and z coordinates of said particular coordinate system.

In an embodiment, the media file complies with the ISOBMFF, and timed media, such as audio and/or video and/or image sequences, are stored as tracks in the media file.

In an embodiment, the sequence of differential locations is stored as a timed metadata track in the media file. The synchronization of the sequence of differential locations with media tracks may be done through time-parallel samples between the synchronized tracks, as explained above.

In an embodiment, a timed metadata track representing the sequence of differential locations is grouped with one or more media tracks with the track grouping mechanism of ISOBMFF. A particular box type, here referred to as 'jacq', for a box contained in the Track Group box may indicate that the tracks are jointly acquired or captured e.g. with the same device or device arrangement. When a differential location timed metadata track is indicated to be in the same track group with a media track, it may be considered to mean that the same capturing device or device arrangement (e.g. a camera rig) was used to capture the differential location information as well as the media data.

In an embodiment, a timed metadata track representing the sequence of differential locations is indicated to refer to one or more media tracks with the track referencing mechanism of ISOBMFF. For example, the 'cdsc' track reference type may be used. Alternatively, a particular track reference type, such as 'jacq', may be used to indicate that timed metadata track provides the location information of the capturing device associated with the linked media tracks.

In an embodiment, the sequence of differential locations is stored as sample auxiliary information in the media file complying with ISOBMFF. In an embodiment, the sequence of differential locations is stored as a sample group in the media file complying with ISOBMFF.

An embodiment related to ISOBMFF is described next. It needs to be understood that the aspects of the invention could alternatively be realized by other similar means in ISOBMFF and/or for other container file formats. In order to store differential location information in an ISOBMFF compliant file, the following information are defined:

DifferentialLocationSampleEntry: Sample entry definition to indicate differentially located samples are present in the track. This entry may also contain the sensors specific properties such as vendor name, error rates, version, etc.

DifferentialLocation Timed Metadata Sample Format: Data storage format and semantics to be used to store the differential location data DifferentialLocationSampleEntry:

A new box type of DifferentialLocationSampleEntry box can be defined as follows:

```
class DifferentialLocationSampleEntry ( ) extends SampleEntry ('difl') {
    unsigned int(8) version;
    unsigned int(16) sample_resolution;
    FullBox SensorPropertiesBox;
}
```

Semantics:

SampleEntry class and any other base classes and their semantics are as defined in ISOBMFF specification ISO/IEC 14496-12.

version: Version number of the DifferentialLocationSampleEntry. It is assumed to be '0'. Any other version definition must also provide a new semantic and structure definition of the DifferentialLocationSampleEntry.

sample_resolution: Representation of 1 unit of measurement. For example, if this value is 1000, an accelerometer sensor measurement of 1 m/s2 in any axis is represented as 1000.

SensorPropertiesBox: Information and specification data of the sensor that provided the samples.

```
class SensorPropertiesBox extends FullBox('sens', version = 0, 0) {
    unsigned int(8) sensor_type;
    string  sensor_vendor;
    string  sensor_version;
    unsigned int(8) axis_convention;
    unsigned int(16) accuracy_resolution;
    unsigned int(32) sensor_accuracy_x;
    unsigned int(32) sensor_accuracy_y;
    unsigned int(32) sensor_accuracy_z;
}
```

Semantics:

sensor_type: An enumerated value that identify the sensor type. The following values are defined and can be extended:
  0x01: Accelerometer with acceleration values in (x,y,z) directions including the force of gravity. Its units are in m/s2
  0x02: Linear Accelerometer with acceleration values in (x,y,z) directions excluding the force of gravity. Its units are in m/s2.

sensor_vendor: String representation of the vendor information sensor_version: String representation of the sensor version as provided by the sensor vendor.

axis_convention: An enumerated value that indicates the axis convention used. The following values are defined and can be extended:
  0x01: ENU (East, North, Up) coordinate system (x axis positively points to east, y axis positively points to north and z axis positively points to up)
  0x02: NED (North, East, Down) coordinate system (x axis positively points to north, y axis positively points to east and z axis positively points to down)
  0x03: WND (West, North, down) coordinate system (x axis positively points to west, y axis positively points to north and z axis positively points to down)

accuracy_resolution: Representation of 1 unit of measurement. For example, if this value is 1000, an accelerometer sensor measurement of 1 m/s2 in any axis is represented as 1000.

sensor_accuracy_x: the accuracy of the sensor in x-axis, given in the accuracy_resolution units.

sensor_accuracy_y: the accuracy of the sensor in y-axis, given in the accuracy_resolution units.

sensor_accuracy_z: the accuracy of the sensor in z-axis, given in the accuracy_resolution units.

DifferentialLocationSampleEntry information can be stored in the SampleDescriptionBox with a handler_type 'meta', as defined in ISOBMFF specification ISO-IEC 14496-12.

DifferentialLocation Timed Metadata Sample Format:

A new sample format can be defined to store the differential sample data.

In this format, the acceleration values in X, Y and Z axis based on a pre-selected axis convention (e.g. North East Down)

```
aligned(8) class DifferentialLocationSample {
    unsigned int(4) version;
        unsigned int(1) initial_location_flag;
        unsigned int(1) initial_velocity_flag;
        unsigned int(1) orientation_flag;
    unsigned int(1) reserved;
        if(initial_location_flag) {
            unsigned int(32) location_type;
            switch (location_type){
              case 'geol':
                float(32) initial_longitude;
                float(32) initial_latitude;
                float(32) initial_altitude;
                break;
              case 'cord':
                int(32) initial_location_x;
                int(32) initial_location_y;
                int(32) initial_location_z;
                break;
            }
        }
        if(initial_velocity_flag) {
        int(32) initial_velocity_x;
            int(32) initial_velocity_y;
            int(32) initial_velocity_z;
        }
        if(orientation_flag){
            int(32) orientation_vector_x;
            int(32) orientation_vector_y;
            int(32) orientation_vector_z;
            int(32) translate_x;
            int(32) translate_y;
            int(32) translate_z;
            int(16) angle_roll;
            int(16) angle_pitch;
            int(16) angle_yaw;
        }
        int(32) acceleration_x;
        int(32) acceleration_y;
        int(32) acceleration_z;
}
```

Semantics:

All acceleration values are in m/s2 and all velocity values are in m/s with the resolution value applied on them.

version: Indicates the version of this sample format. In this definition, it is assumed to be 0.

initial_velocity_flag: Indicates that an initial velocity data is present in the sample.

initial_location_flag: Indicates that an initial location data is present in the sample.

orientation_flag: Indicates that a camera view orientation data is present in the sample.
location_type: Type of the initial location data. Two values are currently defined:
 'geol': geolocation data
 'cord': Coordinate data with coordinate axis conventions as defined in the related sample entry
initial_longitude: Longitude defined as a 32-bit float value in degrees.
initial_latitude: Latitude defined as a 32-bit float value in degrees.
initial_altitude: Altitude defined as a 32 bit float value in meters above the WSG84 reference ellipsoid.
initial_location_x: x-coordinate of the initial location in the coordinate axis conventions as defined in the related sample entry.
initial_location_y: y-coordinate of the initial location in the coordinate axis conventions as defined in the related sample entry.
initial_location_z: z-coordinate of the initial location in the coordinate axis conventions as defined in the related sample entry.
reserved: Fields that are currently reserved in this version of the sample format.
initial_velocity_x: x-axis component of the initial velocity. It is represented in the coordinate axis convention and resolution defined in the proper DifferentialLocationSampleEntry.
initial_velocity_y: y-axis component of the initial velocity. It is represented in the coordinate axis convention defined in the proper DifferentialLocationSampleEntry.
initial_velocity_z: z-axis component of the initial velocity. It is represented in the coordinate axis convention defined in the proper DifferentialLocationSampleEntry.
acceleration_x: x-axis component of the acceleration. It is represented in the coordinate axis convention and resolution defined in the proper DifferentialLocationSampleEntry.
acceleration_y: y-axis component of the acceleration. It is represented in the coordinate axis convention and resolution defined in the proper DifferentialLocationSampleEntry.
acceleration_z: z-axis component of the acceleration. It is represented in the coordinate axis convention and resolution defined in the proper DifferentialLocationSampleEntry.
orientation_vector_x: x-axis component of the camera view orientation. It is represented in the coordinate axis convention defined in the proper DifferentialLocationSampleEntry.
orientation_vector_y: y-axis component of the camera view orientation. It is represented in the coordinate axis convention defined in the proper DifferentialLocationSampleEntry.
orientation_vector_z: z-axis component of the camera view orientation. It is represented in the coordinate axis convention defined in the proper DifferentialLocationSampleEntry.
translate_x: Camera translation of location in x-axis. It is represented in the coordinate axis convention defined in the proper DifferentialLocationSampleEntry.
translate_y; Camera translation of location in y-axis. It is represented in the coordinate axis convention defined in the proper DifferentialLocationSampleEntry.
translate_z; Camera translation of location in z-axis. It is represented in the coordinate axis convention defined in the proper DifferentialLocationSampleEntry.
angle_roll; Roll angle of the camera in degrees.
angle_pitch; Pitch angle of the camera in degrees.
angle_yaw; Yaw angle of the camera in degrees.
It must be noted that the above-mentioned structure can be extended to cover different {lat,lon,alt} representations. For example, latitude and longitude could be represented as signed 32-bit integers. The most appropriate and error-free representation is considered in the class DifferentialLocationSample.

The samples that contain initial location information can be treated as 'location sync samples'. The samples that contain initial velocity information can be treated as 'velocity sync samples'. A sample may contain both.

Figure 3:
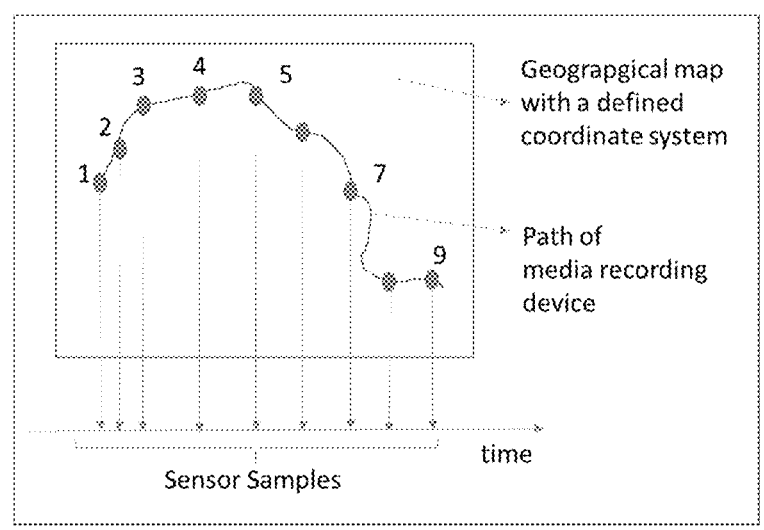
FIG. 3 shows sample data sampling in time as in accordance with example embodiments of the invention.

A media recording device with access to proper sensor information creates a media recording and also records the sensor information. Each sensor data sample corresponds to a particular time as illustrated in FIG. 3.

Figure 4:
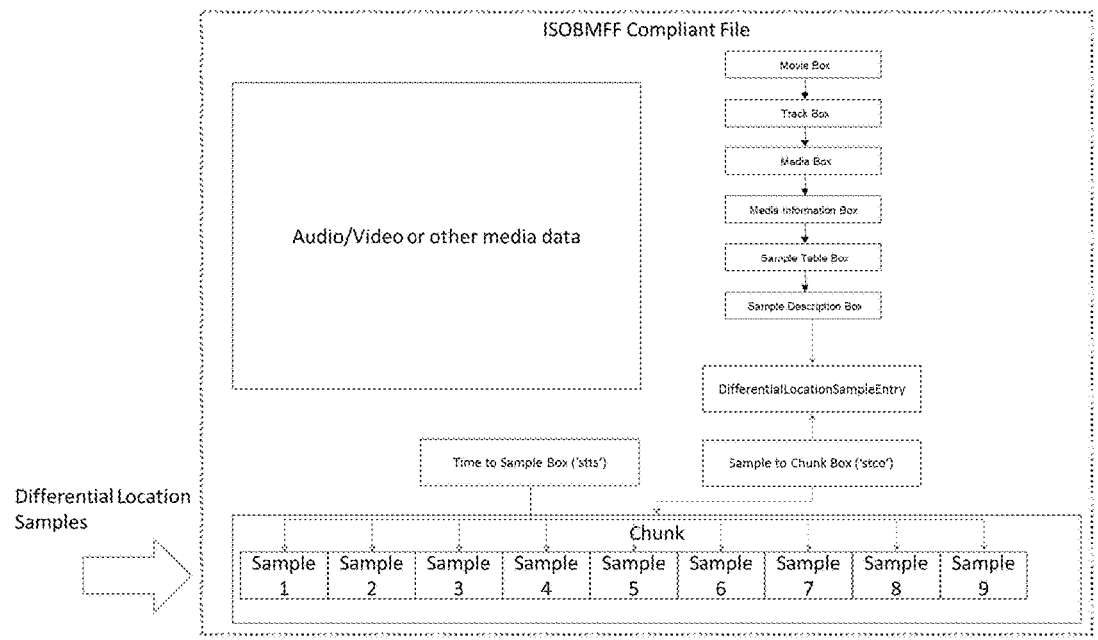
FIG. 4 shows storage of differential location samples in an ISOBMFF compliant file as in accordance with example embodiments of the invention.

During the creation of the media file, these sensor data samples are also recorded with proper timing information. They are stored as Differential Location Samples in the file, as illustrated in FIG. 4. As shown in FIG. 4 there is ISOBMFF compliant file which includes the ISO file format box structure hierarchy as shown in FIG. 1. The ISO file format box structure hierarchy includes a differentiallocationsampleentry 115 as discussed above, and a sample to chunk box (stco) 118. In FIG. 4, the audio/video media data 125 is stored in the differential location samples 128 using the time to sample box (stss) 127.

These samples are referenced by a 'timed meta track' in the file and have matching timestamps with the audio/visual data (e.g. as defined for time-parallel samples above). Hence, any audio/visual data with relevant time information may have a related sensor data stored as differential location sample. It may be so that the sampling frequency of sensor data is sparser or denser than sampling frequency of the audio/visual media data.

Based on the defined sample format, in the case of presence of a global positioning system, Differential Location Samples can store the Global positioning information as 'initial geo locations' information.

In case of loss of global positioning system signal, the initial velocity information and sensor information can be stored in the differential location sample. It is sufficient (but not limited) to store the initial velocity information only once, because the location in time is calculated in a differential way from an initial condition (in this case, the initial velocity and location).

Figure 5:
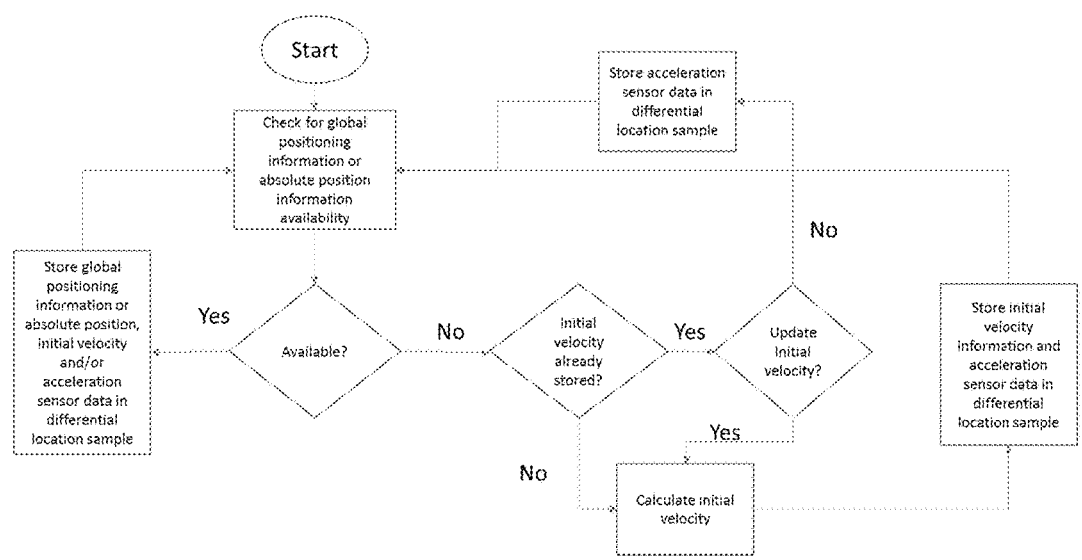
FIG. 5 shows a possible flow structure for the storage of differential location samples with minimal error.

FIG. 5 shows a flow diagram which can be utilized for a recording of the differential location information with minimal error in accordance with an example embodiment of the invention. As shown in step 510 of FIG. 5 there is checking for absolute position information, such as global positioning information. If available (step 520), then at step 525 there is storing the position information and/or acceleration sensor data as a differential location sample. If the absolute position information is not available (step 520) then at step 530 there is determining whether an initial velocity is stored. Where if the initial velocity is stored then at step 532 there is updating the initial velocity if needed. At steps 534 and 536 there is calculating and storing initial velocity information in a differential location sample. At step 538 there is storing acceleration sensor data information in a differential location sample.

Figure 6:
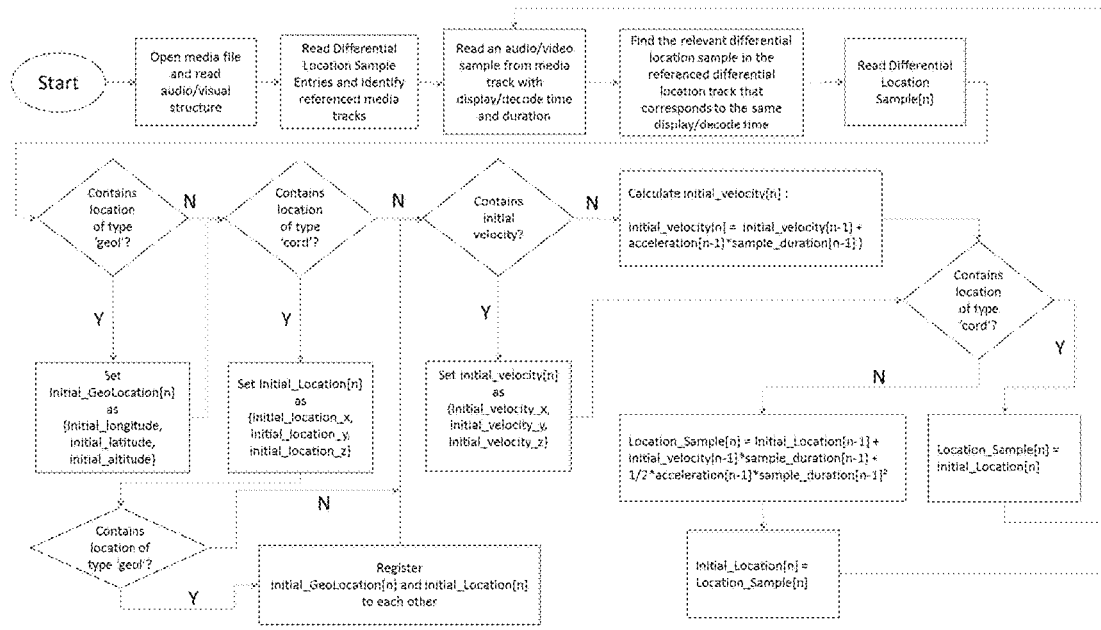
FIG. 6 shows a possible flow diagram for reconstruction of absolute locations by a player/parser as in accordance with example embodiments of the invention.

FIG. 6 shows a flow diagram which can be utilized for reconstruction of absolute locations from differential locations. In step 605 of FIG. 6 there is opening a media file and reading audio/visual structure. Step 610 there is reading differential location sample entries and identifying referenced media tracks. At step 615 there is reading audio visual samples from media track with display decode time and duration. At step 620 there is finding the relevant differential location sample in the referenced differential location track that corresponds to the same display/decode time. At step 625 there is reading a differential location sample [n]. At step 630 there is determining whether the differential location sample includes a type 'geol'. If not, then there is determining whether the differential location sample includes a type 'cord'. If not, then there is determining whether the differential location sample includes initial velocity. If yes to any of these then there is setting initial geolocations, setting initial locations, and setting initial velocity as in step s 632, 637, and 642, respectively. If there is a no answer to the determination of step 635 then the flow goes to steps 639 and potentially 638. Then there is at step 650, after calculating the initial velocity, determining whether the differential location sample includes location of type 'cord'. If yes, then at step 654 there is setting the location_sample[n] as the initial_location[n]. If no, then at steps 652 and 656 there is identifying and then setting the initial_location[n] as the location_sample[n]. It is noted that an initial_location[i] refers to an absolute location vector of the differential location sample[i] that corresponds to a media sample with the same location in time acceleration[i] refers to the vector [acceleration_x, acceleration_y, acceleration_z] read from the differentional location sample[i].

In accordance with an example embodiment of the invention the initial_location[0] is assumed to be {0,0,0} unless otherwise set by the DifferentialLocationSample[0]. Location_Sample[0] is assumed to be initial_location[0].

For global positioning system outage scenarios, it is recommended that the first differential location sample that refers to the outage contains the last computable Geo Location and the initial location of type 'cord' in order to register the geo location to the coordinate location.

Additional Embodiments

In an embodiment, the geographical location, such as the GPS position, of the device is stored in a file in addition to its differential location information. The geographical location may be stored in the same samples or may be stored separately e.g. in its own separate timed metadata track, which may be associated with the differential location timed metadata track using e.g. track references or track grouping. The geographical location track and/or the differential location track may contain information on sample data reliability and/or accuracy. The reliability and/or accuracy data may reside for example in a sample entry and/or in a sample format. For example, it may be indicated that particular geographical location samples are unreliable (e.g. due to weak received GPS signal) or information on the reliability, such as the number of satellites based on which the location is calculated may be stored. The accuracy data may for example indicate an estimate of the how large an error the geographical position may have. A file parser may conclude from the reliability and/or accuracy of the geographical location track and/or the differential location track, which samples are parsed to obtain an estimate of the location of the device.

In an embodiment, rather than including an initial location within a differential location sample, it can be indicated in the differential location sample that the initial location can be obtained from the time-aligned sample of an associated geographical location track.

In an embodiment, the orientation of the device is stored in a file in addition to its differential location information. A sequence of device orientations is obtained e.g. from one or more sensors, where each device orientation in the sequence may be associated with a time, which may be for example the time the one or more sensors acquired the device orientation. The device orientation may for example indicate a camera direction used in capturing a video sequence that is also stored in the file. The device orientation may for example be represented by roll, pitch, and yaw angles; or it may be represented by a 3×3 rotation matrix. The orientation may be stored in the same samples together with the differential location information, e.g. as described earlier, or it may be stored separately e.g. in its own separate timed metadata track, which may be associated with the differential location timed metadata track using e.g. track references or track grouping. In some cases, the device may contain multiple capturing apparatuses, such as cameras and/or microphones, which may or may not be individually oriented. The differential location information may therefore be associated with more than one sequence of capturing device orientations, each e.g. corresponding to a different camera, microphone, or some other sensor.

In an embodiment, the differential location track and/or the geographical location track and/or the device orientation track are associated with media tracks that are captured with the same device or device arrangement, such as a camera rig also containing the sensor devices needed to obtain differential location and/or geographical location and/or device orientation.

The invention has been described above with reference to multimedia container files and particularly ISOBMFF. It needs to be understood that the invention can be similarly realized with other multimedia container file formats, such as Matroska. The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

It needs to be understood that the invention can be similarly realized to encapsulate differential location information for transmission instead of or in addition to storing differential location information into a media file. For example, embodiments can be similarly realized to encapsulate differential location data into RTP packets, where the RTP packet payload essentially contains the same or similar information as the sample format, and the MIME parameters or alike may contain the same or similar information as the sample entry. In another example, embodiments can be similarly realized to encapsulate differential location data into MPEG-2 transport stream, where an elementary stream is specified to contain differential location information stored in samples, and/or descriptors or alike may be defined to contain information the same or similar information as the sample entry. In yet another example, embodiments can be realized by storing differential location information in a media file according to a container file format, such as ISOBMFF, and/or according to a segment format for adaptive streaming over HTTP, such as ISOBMFF-based segment format specified in the MPEG-DASH standard, specified in ISO/IEC International Standard 23009-1. Differential location information stored within container file and/or as segment(s) can be transmitted using adaptive HTTP streaming, in which a client may issue an HTTP GET request for a resource, such as for a segment comprising differential location information.

Real-time Transport Protocol (RTP) is widely used for real-time transport of timed media such as audio and video. RTP may operate on top of the User Datagram Protocol (UDP), which in turn may operate on top of the Internet Protocol (IP). RTP is specified in Internet Engineering Task Force (IETF) Request for Comments (RFC) 3550, available from www.ietf.org/rfc/rfc3550.txt. In RTP transport, media data is encapsulated into RTP packets. Typically, each media type or media coding format has a dedicated RTP payload format.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called as content types. Several MIME type/subtype combinations exist that can contain different media formats. In addition to type/subtype, media format specific MIME parameters may be specified. Content type information may be included by a transmitting entity in a MIME header at the beginning of a media transmission. A receiving entity thus may need to examine the details of such media content to determine if the specific elements can be rendered given an available set of codecs. In the absence of the parameters described here, it is necessary to examine each media element in order to determine the codecs or other features required to render the content.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

In DASH (Dynamic Adaptive Streaming over HTTP), the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

Regarding the options for transmission connections and protocols, DASH may be realized with various protocols enabling to request segments or sub-segments, including but not limited to different versions of HTTP, such as HTTP/1.1 and HTTP/2.0, WebSockets, and SPDY. DASH may be applied in cases where no requests, such as HTTP GET, are made by a client, e.g. when a client receives data through a broadcast, such as a broadcast service according to 3GPP Multimedia Broadcast/Multicast Service (MBMS).

The invention improves the storage of location and camera orientation information for audio-visual sequences in ISOBMFF compliant files. By utilizing the sensors on the device, a differential location information can be generated and stored in the media file even though there is no global positioning system signal coverage. This approach improves the previously introduced geo location storage mechanism for 3GPP files.

One possible issue is the error accumulation nature of the differential location systems. Since each new location is calculated based on the previous location information (i.e. integral based calculation), any error introduced in the differential location samples accumulate and effect the upcoming locations. Such an error usually is introduced by the sensors. Such errors can be further reduced by utilizing post-processing algorithms on the location data. Such post-processing algorithms are usually delivered by the sensor manufacturers as post-processing applications.

Figure 7:
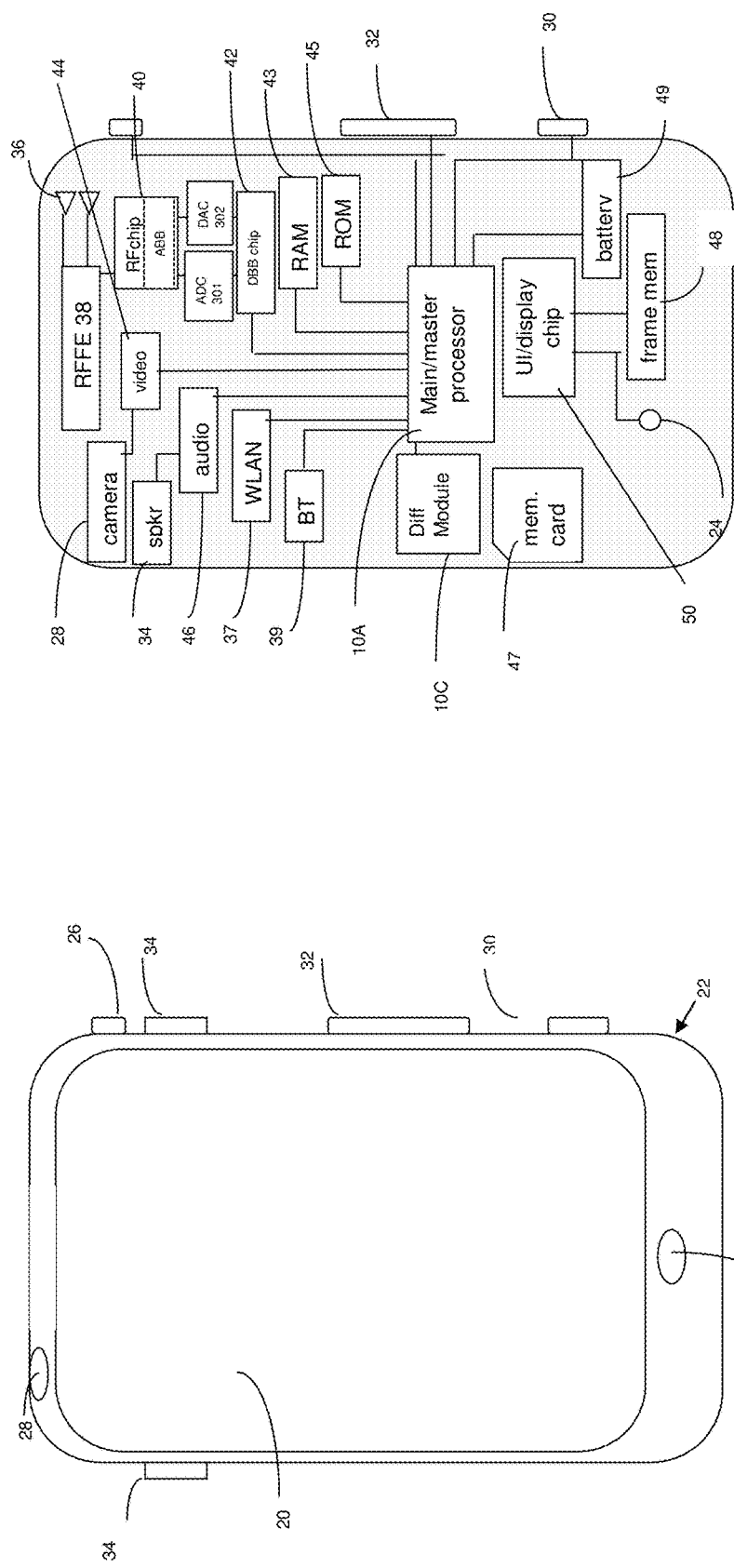
FIG. 7 shows an non-limiting embodiment of a portable electronic device in which aspects of the invention may be practiced.

FIG. 7 shows a schematic diagram in plain view (left) and sectional view (right) of a mobile handset capable of performing operations according to some embodiments of the invention. The mobile handset may be an MR 221 as shown in FIG. 2. The UE 22 in both plan view (left) and sectional view (right) which may be configured to perform the operations in accordance with some embodiments. As shown in FIG. 7, the UE 22 includes a graphical display interface 20 (e.g., touchscreen) and a user interface that comprises a microphone 24 and speaker(s) 34 and touch-screen technology at the graphical display interface 20 and/or voice-recognition technology for audio signals received at the microphone 24. A power actuator 26 controls the UE 22 being turned on and/or off by the user. The UE 22 may include a camera(s) module 28, which is shown as forward facing (e.g., for video calls) but may alternatively or additionally be rearward facing (e.g., for capturing images and video for local storage). The camera(s) 28 may be controlled by a shutter actuator 30 and optionally by a zoom actuator 32, which may alternatively function as a volume adjustment for the speaker(s) 34 when the camera 28 is not in an active mode. Signals to and from the camera(s) 28 pass through an image/video processor (video) 44, which encodes and decodes the image data (e.g., image frames). A separate audio processor 46 may also be present to control signals to and from the speakers (spkr) 34 and the microphone 24. The graphical display interface 20 is refreshed from a frame memory (frame mem) 48 as controlled by a user GPU 50, which may process signals to and from the display interface 20. These actuators may also be implemented using touch-screen technology.

Also within the sectional view of FIG. 7 are seen multiple transmit/receive antennas 36 that are typically used for wireless communication (e.g., cellular communication). The antennas 36 may be multi-band for use with other radios in the UE. The operable ground plane for the antennas 36 may span the entire space enclosed by the UE housing, though in some embodiments the ground plane may be limited to a smaller area, such as disposed on a printed wiring board on which a RF front-end (RFFE) 38 is formed. The RFFE 38 controls power amplification on the channels being transmitted on and/or across the antennas that transmit simultaneously, where spatial diversity is used. The RFFE 38 outputs to the radio frequency (RF) chip 40, which amplifies, demodulates and down converts the signal for analog baseband (ABB) processing. The analog to digital converter (ADC) 301 converted analog signal to bit-stream, which the digital baseband (DBB) chip 42 detects and finally decoded Similar processing occurs in reverse for signals generated in the UE 22 and transmitted from the UE.

In addition, the UE 22 includes a Diff module 10C which is configured to perform differential location operations for the sensing as described herein, and also work to perform related operations including communicating with a global positioning system such as the NN 223 of FIG. 2. Further, the Diff module 10C can be capable of operations including sensing data such as, but not limited to, compass, altitude, latitude, and elevation data, as in accordance with example embodiments of the invention.

The DBB and/or RFIC may also include any of a processor and a memory including computer program code, which controlling transceivers parameters to optimize performance of it. Program code could be storage to memory and it may include algorithms and/or lookup tables (LUT). In addition, it is noted that the placement of any of these components are not limiting and any of the components shown in FIG. 7 may be placed differently and still operate in accordance with the embodiments. As an example, the ADC and DAC could be on the RFIC side or in the BB side or they even could be separate from both. It is noted that any of the configuration shown in FIG. 7 is not limiting to operations performed in accordance with embodiments of the invention.

Certain embodiments of the UE 22 may also include one or more secondary radios such as a wireless local area network radio (WLAN) 37 and/or a Bluetooth radio (BT) 39, which may incorporate one or more on-chip antennas or be coupled to one or more off-chip antennas. Throughout the UE 22 are various memories 125, such as a random access memory (RAM) 43, a read only memory (ROM) 45, and, in some embodiments, a removable memory such as the illustrated memory card 47. In some embodiments, various programs (such as computer program code 315) are stored on the memory card 47. The components within the UE 22 may be powered by a portable power supply such as a battery 49.

Figure 8A:
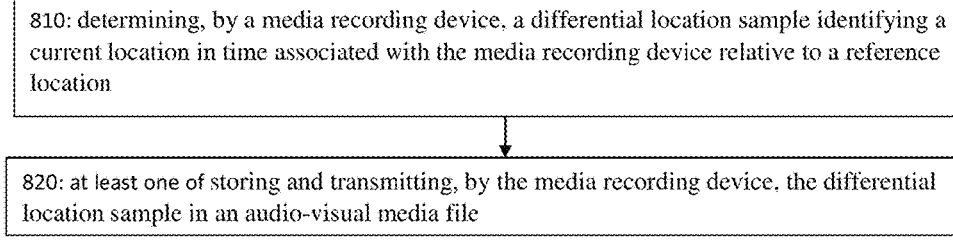
FIGS. 8A and 8B are each logic flow diagrams illustrating an operation of a method, and a result of execution of computer program instructions embodied on a computer readable memory, for practicing example embodiments of this invention.

FIG. 8A illustrates operations which may be performed by a device such as, but not limited to, a media recording device configured to connect with a network (e.g., the MR 221 as in FIG. 2). As shown in step 810 of FIG. 8A, there is determining, by a media recording device, a differential location sample identifying a current location in time associated with the media recording device relative to a reference location. Then at step 820 of FIG. 8A there is at least one of storing and transmitting, by the media recording device, the differential location sample in an audio-visual media file.

In accordance with some embodiments as described in the paragraph above, there is: identifying the initial velocity and acceleration data of the media recording device, wherein the initial velocity and acceleration data comprises x, y, and z axis values based on a pre-selected axis convention; and storing the identified initial velocity and acceleration data of the media recording device with the differential location sample in the audio-visual media file, wherein the initial velocity and acceleration data are determined from sensing using at least one of an accelerometer and an altitude sensor of the media recording device.

In accordance with some embodiments as described in the paragraphs above, the audio-visual media file comprises a data sample definition referencing mechanism to indicate the differential location sample data storage format which has associated sampling time information to store the differential location sample data in the audio-visual media file.

In accordance with some embodiments as described in the paragraphs above, the reference location in time is obtained from a time-aligned sample of a geographical location track associated with the media recording device, wherein the geographical location track is based on actual geographical coordinate data or virtual reality geographical coordinate data determined by the media recording device.

In accordance with some embodiments as described in the paragraphs above, there is identifying and storing an orientation associated with the media recording device with the differential location sample in the audio-visual media file, wherein the orientation associated with the media recording device comprises camera view orientation data of the media recording device.

In accordance with an embodiment of the invention as described above there is an apparatus comprising: means for determining [DP 221A of FIG. 2], by a device [e.g., MR221, eNB 222, and/or NN 223 of FIG. 2], a differential location sample identifying a current location in time associated with the media recording device relative to a reference location. Further, there is means for at least one of storing and transmitting, by the apparatus [e.g., MR221, eNB 222, and/or NN 223, DP 221A, DP 222A, DP 223A of FIG. 2], the differential location sample in an audio-visual media file.

Figure 8B:
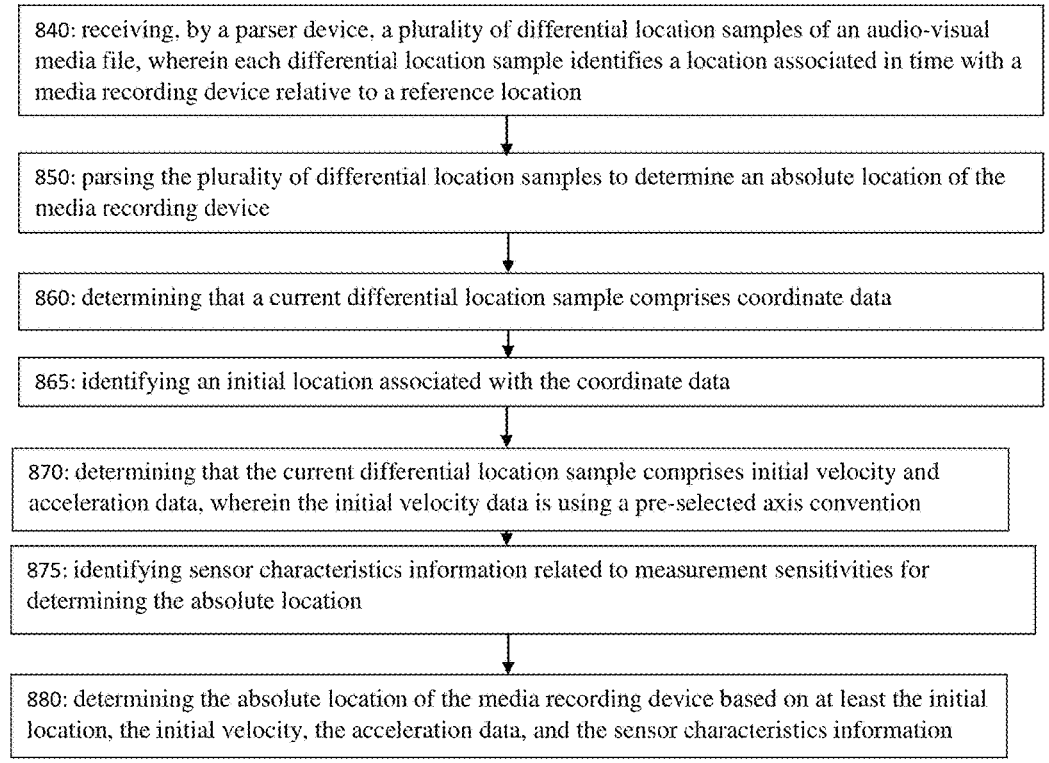

FIG. 8B illustrates operations which may be performed by a device such as, but not limited to, a media parsing device (e.g., incorporated with the MR221, eNB 222, and/or NN 223 as in FIG. 2). As shown in step 840 of FIG. 8B, there is receiving, by a parser device, a plurality of differential location samples of an audio-visual media file, wherein each differential location sample identifies a location associated in time with a media recording device relative to a reference location. This step comprising, as shown in step 850 of FIG. 8B parsing the plurality of differential location samples to determine an absolute location of the media recording device. At step 860 there is determining that a current differential location sample comprises coordinate data. At step 865 there is identifying an initial location associated with the coordinate data. At step 870 there is determining that a current differential location sample comprises initial velocity and acceleration data, wherein the initial velocity data is using a pre-selected axis convention. At step 875 there is identifying sensor characteristics information related to measurement sensitivities for determining the absolute location. Then at step 880 of FIG. 8B there is determining the absolute location of the media recording device based on at least the initial location, the initial velocity, the acceleration data, and the sensor characteristics information.

In accordance with an embodiment of the invention as described above there is an apparatus comprising: means for receiving, [e.g., DP 221A, DP 222A, DP 223A of FIG. 2], with a parser device [e.g., MR221, eNB 222, and/or NN 223], a plurality of differential location samples of an audio-visual media file, wherein each differential location sample identifies a location associated in time with the media recording device relative to a reference location; means for parsing the plurality of differential location samples to identify an absolute location of a media recording device, comprising: means for determining that a current differential location sample comprises coordinate data; and means for identifying an initial location associated with the coordinate data; means for determining [e.g., DP 221A, DP 222A, DP 223A of FIG. 2] that a current differential location sample comprises an initial location of the media recording device; means for determining that the current differential location sample comprises initial velocity and acceleration data, wherein the initial velocity data is using a pre-selected axis convention; means for identifying sensor characteristics information related to measurement sensitivities for determining the absolute location and means for determining the absolute location of the media recording device based on at least the initial location, the initial velocity, the acceleration data, and the sensor characteristics information.

Embodiments similar to that described above in relation to FIG. 8B may be similarly realized through receiving a plurality of differential location samples using a communication protocol and/or format and then decapsulating the plurality of differential location samples from the communication protocol and/or format to identify an absolute location of a media recording device, instead of or in addition to is parsing a plurality of differential location samples of an audio-visual media file. For example, a plurality of differential location samples may be received in and decapsulated from RTP packets, MPEG-2 transport stream, or segments (or parts thereof) used for adaptive streaming over HTTP.

Some embodiments have been described above in relation to audio-visual capturing and/or audio, video, and/or image sequence tracks. It needs to be understood that embodiments can be similarly realized with any sensor data capturing and any types of media or metadata tracks. For example, sensor data may comprise of temperature, signal strength information (of a radio access network such as a mobile cellular network or a wireless local area network), or radiation information (of certain wavelength range).

Some embodiments have been described above in relation to storing differential location information in a media file. It needs to be understood that embodiments may be similarly realized by storing differential location information in a file that is separate from the media file and only referred to by the media file. For example, the data referencing mechanism of ISOBMFF may be used. Similarly, the audio-visual data (e.g. coded data for media tracks of ISOBMFF) may be stored in a file that is separate from the media file. The media file may comply with a container file format, such as ISOBMFF, whereas the separate file(s) containing differential location information and/or coded media data need not (but may) comply with a container file format, such as ISOBMFF.

Some embodiments have been described above in relation to capturing audio-visual data and differential location information. It needs to be understood that embodiments may be similarly realized when audio-visual data and/or differential location information is not captured but rather synthetically generated. For example, a computer-generated video clip may be generated with computer-generated differential location information, and both the video and the differential location information can be stored in a media file according to one or more embodiments above.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" may be used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   determining, by a media recording device, a differential location sample identifying a current location in time associated with the media recording device relative to a reference location;
   identifying initial velocity and acceleration data of the media recording device towards an indicated direction, wherein the initial velocity and acceleration data comprises x, y, and z axis values based on a pre-selected axis convention;
   storing in an audio-visual media file the differential location sample expressed in terms of the identified initial velocity and acceleration data of the media recording device towards the indicated direction, wherein the initial velocity and acceleration data are determined from sensing using at least one of an accelerometer and an altitude sensor of the media recording device; and
   transmitting, by the media recording device, the differential location sample in the audio-visual media file.

2. The method according to claim 1, wherein the audio-visual media file comprises a data sample definition referencing mechanism to indicate the differential location sample data storage format which has associated sampling time information to store the differential location sample data in the audio-visual media file.

3. The method according to claim 1, wherein the reference location in time is obtained from a time-aligned sample of a geographical location track associated with the media recording device, wherein the geographical location track is based on actual geographical coordinate data or virtual reality geographical coordinate data determined by the media recording device.

4. The method according to claim 1, comprising identifying and storing an orientation associated with the media recording device with the differential location sample in the audio-visual media file, wherein the orientation associated with the media recording device comprises camera view orientation data of the media recording device.

5. The method according to claim 1 performed by a non-transitory computer readable medium including computer program code, and the computer program code executed by at least one processor.

6. An apparatus comprising:
   at least one processor; and
   at least one memory including computer program code, where the at least one memory and the computer program code are configured, with the at least one processor, to cause the apparatus to at least:
   determine, with a media recording device, a differential location sample identifying a current location in time associated with the media recording device relative to a reference, location;
   identify initial velocity and acceleration data of the media recording device towards an indicated direction, wherein the initial velocity and acceleration data comprises x, y, and z axis values based on a pre-selected axis convention;
   storing in an audio-visual media file the differential location sample expressed in terms of the identified initial velocity and acceleration data of the media recording device towards the indicated direction, wherein the initial velocity and acceleration data are determined from sensing using at least one of an accelerometer and an altitude sensor of the media recording device; and
   transmit, with the media recording device, the differential location sample in the audio-visual media file.

7. The apparatus according to claim 6, wherein the audio-visual media file comprises a data sample definition referencing mechanism to indicate the differential location sample data storage format which has associated sampling time information to store the differential location sample data in the audio-visual media file.

8. The apparatus according to claim 6, wherein the reference location in time is obtained from a time-aligned sample of a geographical location track associated with the media recording device, wherein the geographical location track is based on actual geographical coordinate data or virtual reality geographical coordinate data determined by the media recording device.

9. The apparatus according to claim 6, wherein the at least one memory including the computer program code is configured with the at least one processor to cause the apparatus to:
   identify and storing an orientation associated with the media recording device with the differential location sample in the audio-visual media file, wherein the orientation associated with the media recording device comprises camera view orientation data of the media recording device.

10. A method, comprising:
    receiving, by a parser device, a plurality of differential location samples of an audio-visual media file, wherein each differential location sample identifies a location associated in time with a media recording device relative to a reference location and an initial velocity and acceleration data of the media recording device toward an indicated direction, wherein the initial velocity and acceleration data comprises x, y, and z axis values based on a pre-selected axis convention determined from at least one of an accelerometer and an altitude sensor of the media recording device; and
    parsing the plurality of differential location samples to determine an absolute location of the media recording device, comprising:
    determining that a current differential location sample comprises coordinate data;
    identifying an initial location associated with the coordinate data;
    determining that the current differential location sample comprises initial velocity and acceleration data, wherein the initial velocity data is using a pre-selected axis convention;
    identifying sensor characteristics information related to measurement sensitivities for determining the absolute location; and
    based on at least the initial location, the initial velocity, the acceleration data, and the sensor characteristics information determining the absolute location of the media recording device.

11. An apparatus, comprising:
    at least one processor; and
    at least one memory including computer program code, where the at least one memory and the computer program code are configured, with the at least one processor, to cause the apparatus to at least:
    receive, with a parser device, a plurality of differential location samples of an audio-visual media file, wherein each differential location sample identifies a location associated in time with a media recording device relative to a reference location and an initial velocity and acceleration data of the media recording device toward an indicated direction, wherein the initial velocity and acceleration data comprises x, y, and z axis values based on a pre-selected axis convention determined from at least one of an accelerometer and an altitude sensor of the media recording device; and parse, with the parser device, the plurality of differential location samples to determine an absolute location of the media recording device, comprising:

determining that a current differential location sample comprises coordinate data;

identifying an initial location associated with the coordinate data;

determining that the current differential location sample comprises initial velocity and acceleration data, wherein the initial velocity data is using a pre-selected axis convention;

identifying sensor characteristics information related to measurement sensitivities for determining the absolute location; and based on at least the initial location, the initial velocity, the acceleration data, and the sensor characteristics information determining the absolute location of the media recording device.

12. The method according to claim 10, wherein the audio-visual media file comprises a data sample definition referencing mechanism to indicate the differential location sample data storage format which has associated sampling time information to store the differential location sample data in the audio-visual media file.

13. The method according to claim 10, wherein the reference location in time is from a time-aligned sample of a geographical location track associated with the media recording device, wherein the geographical location track is based on actual geographical coordinate data or virtual reality geographical coordinate data determined by the media recording device.

14. The method according to claim 10, wherein the plurality of differential location samples comprises an orientation associated with the media recording device, wherein the orientation associated with the media recording device comprises camera view orientation data of the media recording device.

* * * * *